(12) United States Patent
Yang et al.

(10) Patent No.: US 8,413,292 B2
(45) Date of Patent: Apr. 9, 2013

(54) WINDSHIELD WIPER ASSEMBLING STRUCTURE FOR PREVENTING LOOSE ATTACHMENT OF DRIVEN WIPER ARM

(76) Inventors: Chih-Ming Yang, Taipei (TW); Chuan-Chih Chang, Taipei (TW)

( * ) Notice: Subject to any disclaimer, the term of this patent is extended or adjusted under 35 U.S.C. 154(b) by 7 days.

(21) Appl. No.: 13/310,789

(22) Filed: Dec. 4, 2011

(65) Prior Publication Data

US 2012/0317740 A1 Dec. 20, 2012

(30) Foreign Application Priority Data

Jun. 14, 2011 (CN) ...................... 2011 2 0199051 U

(51) Int. Cl.
*B60S 1/40* (2006.01)
*B60S 1/38* (2006.01)
(52) U.S. Cl. ................................ 15/250.32; 15/250.351
(58) Field of Classification Search ............... 15/250.31, 15/250.32, 250.43, 250.44, 250.361, 250.351, 15/250.201
See application file for complete search history.

(56) References Cited

U.S. PATENT DOCUMENTS 7,299,520 B2 * 11/2007 Huang ........................ 15/250.32
2006/0064838 A1 * 3/2006 Poton ......................... 15/250.32

* cited by examiner

*Primary Examiner* — Gary Graham
(74) *Attorney, Agent, or Firm* — Chun-Ming Shih; HDLS IPR Services

(57) ABSTRACT

A windshield wiper assembling structure for preventing loose attachment of a driven wiper arm assembles the driven wiper arm having a hook arm on a windshield wiper fixing stage. The windshield wiper assembling structure includes an assembling stage and a positioning stage. The assembling stage has a through groove, an elastic blocking slice, and a first fastening groove which is formed at one side edge of the elastic blocking slice. The first fastening groove fastens on the windshield wiper fixing stage. The assembling stage has a containing groove on a top surface thereof to accommodate the hook arm. The positioning stage has a cover cap and a positioning arm which is extended from the cover cap. The positioning arm has a second fastening groove corresponding to the first fastening groove. The second fastening groove fastens on the windshield wiper fixing stage and corresponding to the first fastening groove.

14 Claims, 8 Drawing Sheets

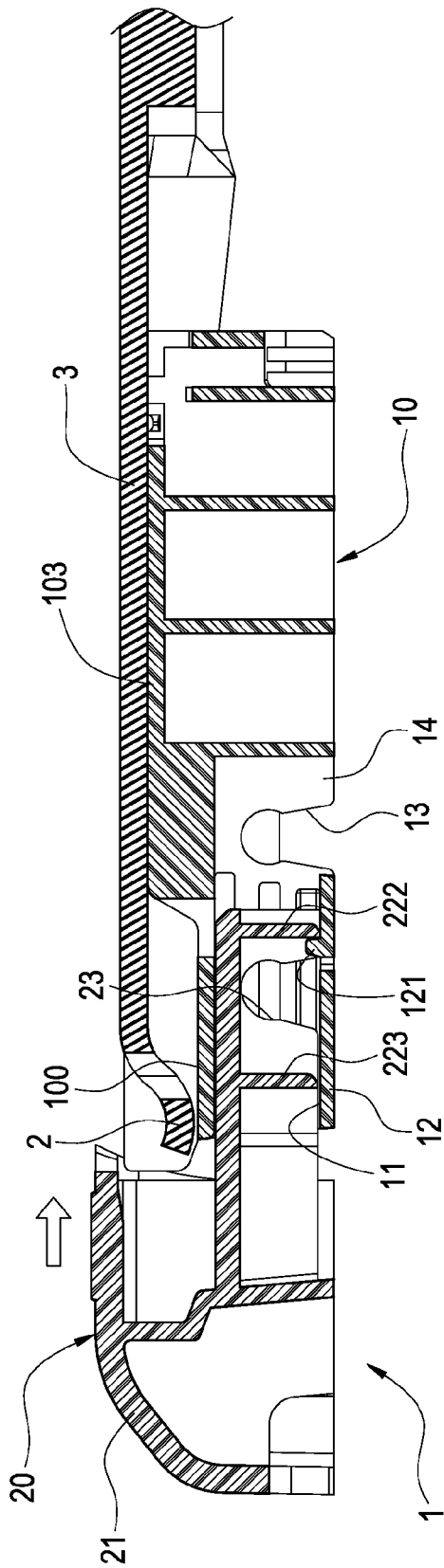
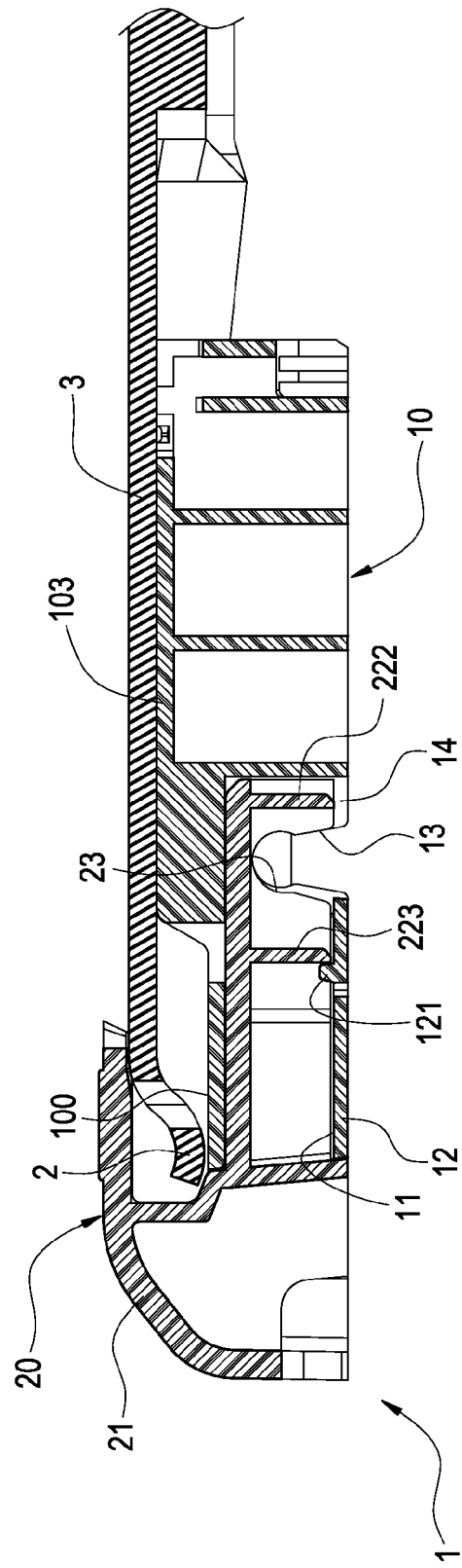
FIG.6
FIG.7

WINDSHIELD WIPER ASSEMBLING STRUCTURE FOR PREVENTING LOOSE ATTACHMENT OF DRIVEN WIPER ARM

BACKGROUND OF THE INVENTION

1. Field of the Invention

The present invention relates generally to a windshield wiper structure, and more particularly to a windshield wiper structure which is installed on a vehicle window.

2. Description of Prior Art

In general, a windshield wiper for a vehicle is installed on a vehicle window of the vehicle. The windshield wiper is connected to a driven wiper arm of the vehicle and the windshield wiper is repeatedly wiped on the vehicle window by applying force on the windshield wiper via the driven wiper arm.

The available windshield wiper on the market mainly includes an assembling stage, a fixing stage, and a supporting rack. The supporting rack installs rubber-made wiper blades on a bottom surface of the supporting rack. The supporting rack is assembled on a bottom surface of the fixing stage and the assembling stage is installed on a top surface of the fixing stage so that the driven wiper arm of the vehicle can be installed on the assembling stage. Accordingly, the wiper blades assembled on the supporting rack is provided to wipe water and dirt attached on the vehicle window by repeatedly swishing the windshield wiper driven by the driven wiper arm back and forth.

The combination structure of the prior art windshield wiper is usually formed by embedding or engaging the driven wiper arm and the assembling stage. The combination structure of the driven wiper arm and the assembling stage is used for a period of time, however, the two components tend to have loose attachment. Accordingly, the driven wiper arm would not reliably press wiper blades so that wiper blades could not tightly contact the vehicle window.

Accordingly, it is desirable to provide a windshield wiper assembling structure for preventing loose attachment of a driven wiper arm to overcome the above-mentioned disadvantages.

SUMMARY OF THE INVENTION

An object of the present invention is to provide a windshield wiper assembling structure for preventing loose attachment of a driven wiper arm so that the driven wiper arm can be firmly combined on the windshield wiper assembling structure.

Another object of the invention is to provide a windshield wiper assembling structure for preventing loose attachment of a driven wiper arm to make the driven wiper arm reliably press wiper blades and wiper blades can tightly contact on the vehicle window so that the windshield wiper can provide good wiping effect.

In order to achieve the above-mentioned objects, the present invention discloses a windshield wiper assembling structure for preventing loose attachment of a driven wiper arm to combine the driven wiper arm having a hook arm on a windshield wiper fixing stage. The windshield wiper assembling structure includes an assembling stage and a positioning stage.

The assembling stage has a through groove, an elastic blocking slice which is arranged in a route of the through groove, and a first fastening groove which is formed at one side edge of the elastic blocking slice. The first fastening groove is fastened on the windshield wiper fixing stage. The assembling stage has a containing groove on a top surface of the assembling stage to accommodate the hook arm.

The positioning stage has a cover cap and a positioning arm which is extended from the cover cap. The hook arm is plunged into the cover cap. The positioning arm has a second fastening groove which is corresponded to the first fastening groove. The positioning arm is slid in the through groove and abutted by the elastic blocking slice. The second fastening groove is fastened on the windshield wiper fixing stage and corresponding to the first fastening groove.

Comparing with the prior art, the driven wiper arm of the present invention is plunged into the positioning stage to make the positioned stage being fastened and positioned by the assembling stage so that the driven wiper arm can be firmly combined on the windshield wiper assembling structure. Also, wiper blades can tightly contact on a vehicle window so that the windshield wiper can provide good wiping effect.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 6 is a first assembled cross-sectional view of the driven wiper arm and an assembling stage according to the present invention;

FIG. 7 is a second assembled cross-sectional view of the driven wiper arm and the assembling stage according to the present invention;

DETAILED DESCRIPTION OF THE INVENTION

Figure 1:
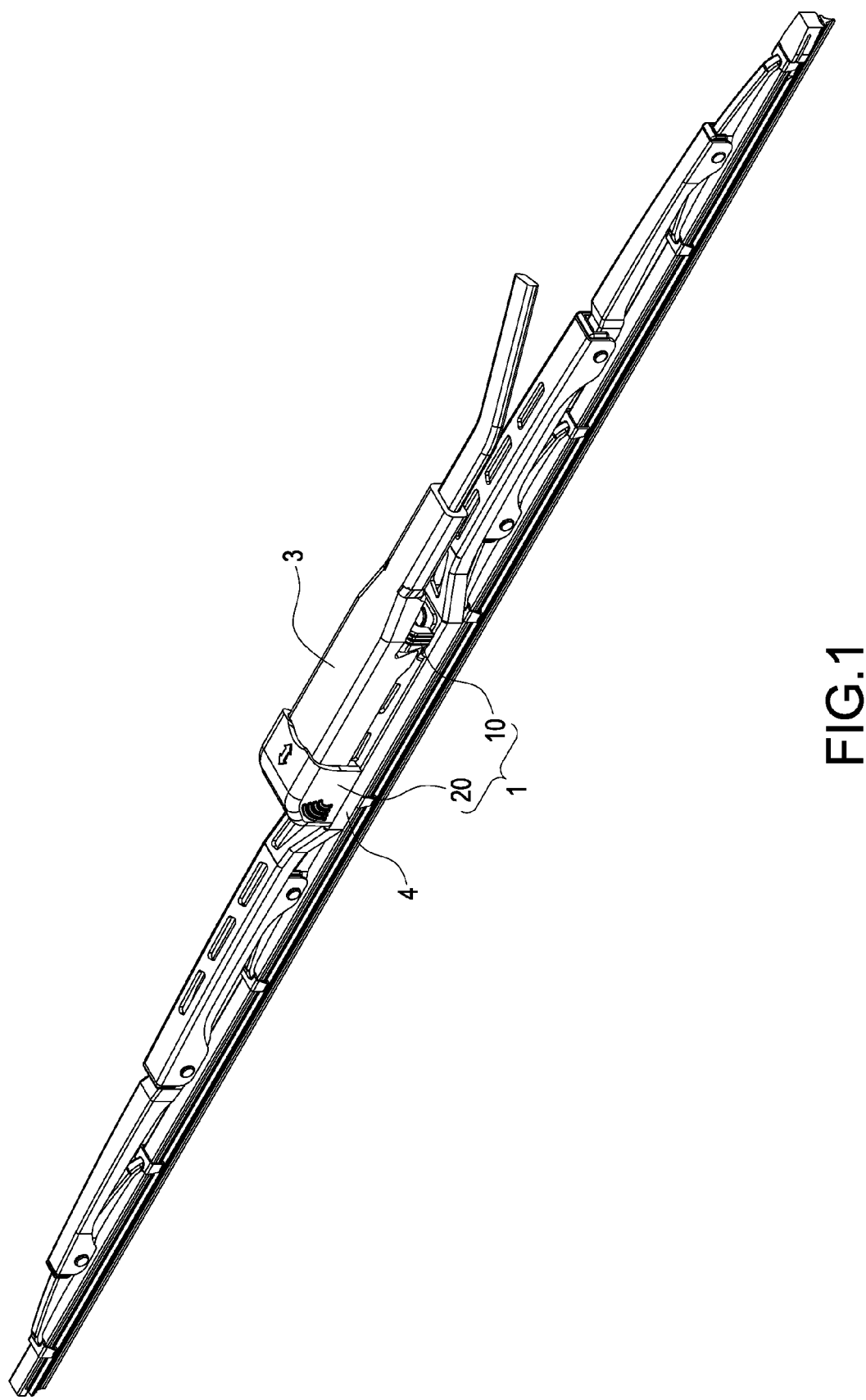
FIG. 1 is a schematic view of using a windshield wiper assembling structure according to the present invention.
Figure 2:
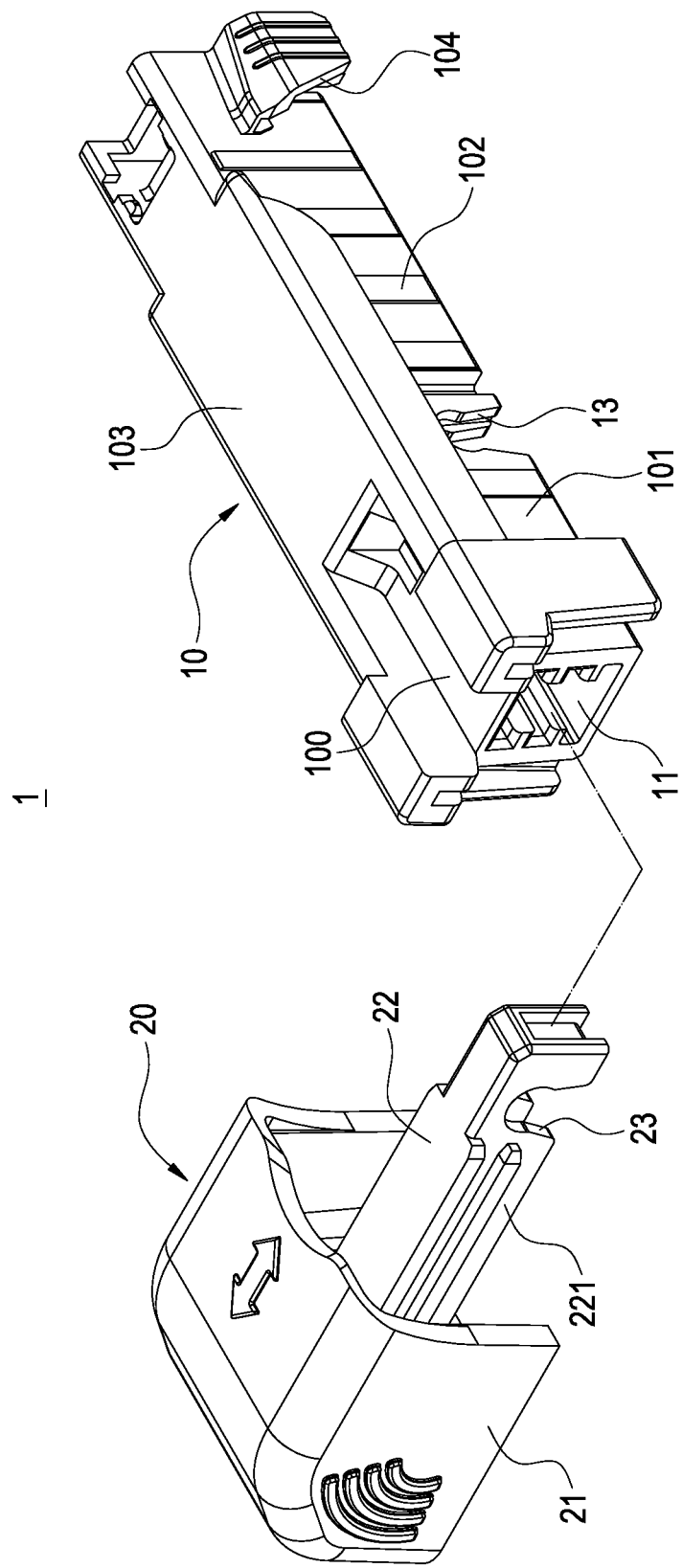
FIG. 2 is a first schematic perspective exploded view of the windshield wiper assembling structure according to the present invention.
Figure 3:
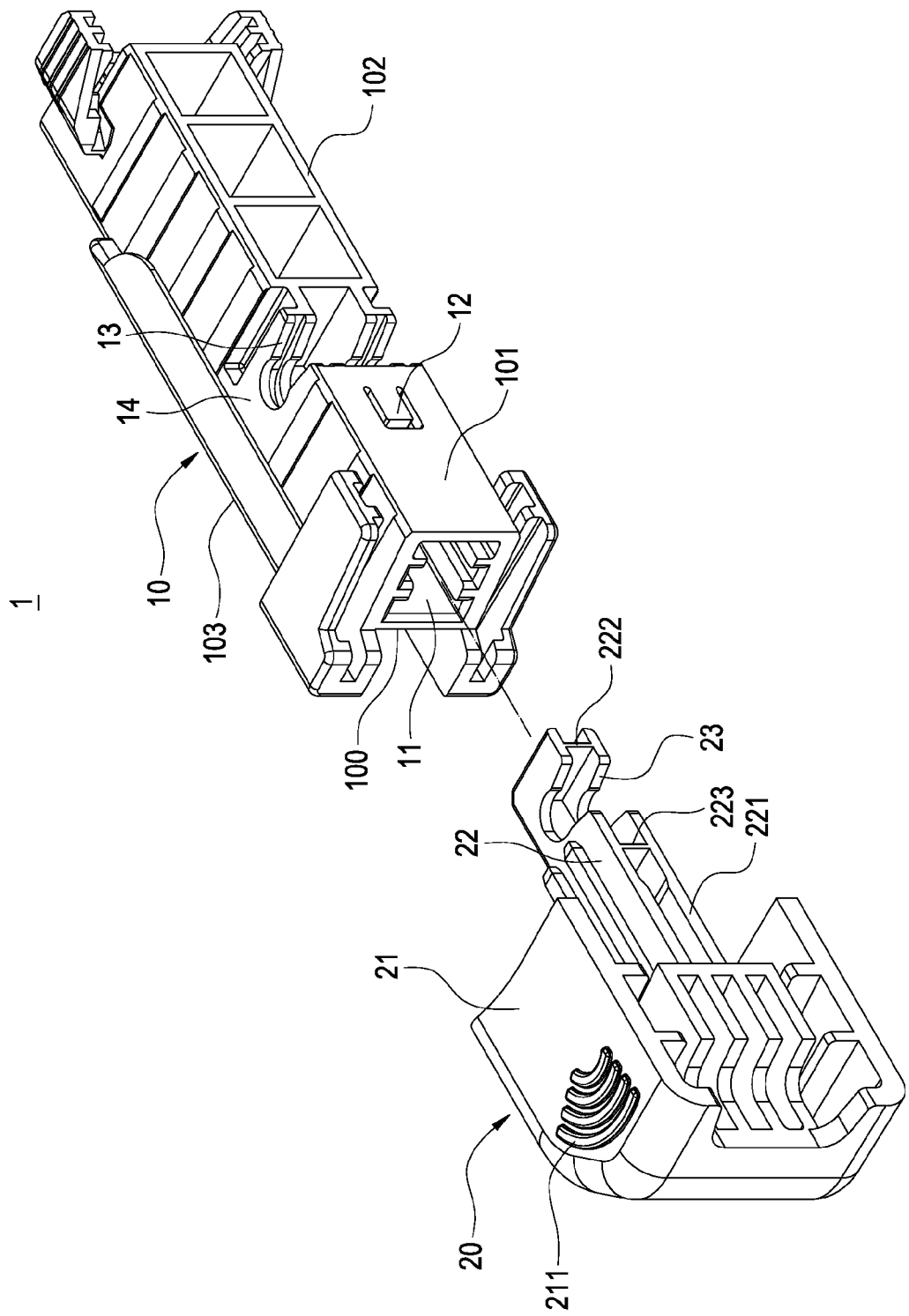
FIG. 3 is a second schematic perspective exploded view of the windshield wiper assembling structure according to the present invention.
Figure 4:
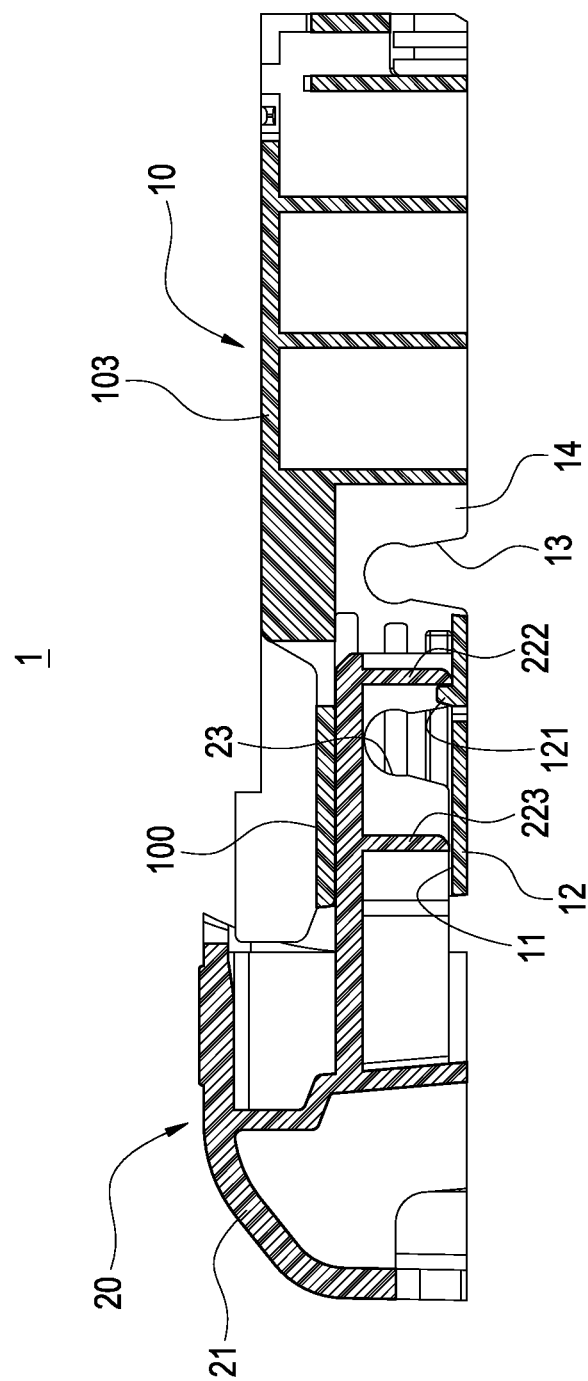
FIG. 4 is an assembled cross-sectional view of the windshield wiper assembling structure according to the present invention.

Reference will now be made to the drawing figures to describe the present invention in detail. Although the present invention has been described with reference to the preferred embodiment thereof, it will be understood that the invention is not limited to the details thereof.

Reference is made from FIG. 1 to FIG. 4 which are a schematic view of using a windshield wiper assembling structure, a first and a second schematic perspective exploded views of the windshield wiper assembling structure, and an assembled cross-sectional view of the windshield wiper assembling structure according to the present invention, respectively. The present invention discloses a windshield wiper assembling structure 1 for preventing loose attachment of a driven wiper arm 3. The windshield wiper assembling structure 1 is provided to combine the driven wiper arm 3 having a hook arm 2 on a windshield wiper fixing stage 4 to prevent loose attachment of the driven wiper arm 3 from the windshield wiper fixing stage 4. The windshield wiper assembling structure 1 includes an assembling stage 10 and a positioning stage 20.

The assembling stage 10 has a through groove 11, an elastic blocking slice 12 which is arranged in a route of the through groove 11, and a first fastening groove 13 which is formed at one side edge of the elastic blocking slice 12. The first fastening groove 13 is fastened on the windshield wiper fixing stage 4 and the assembling stage 10 has a containing groove 100 on a top surface of the assembling stage 10 to accommodate the hook arm 2.

The positioning stage 20 has a cover cap 21 and a positioning arm 22 which is extended from the cover cap 21. The hook arm 2 is plunged into the cover cap 21. The positioning arm 22 has a second fastening groove 23 which is corresponded to the first fastening groove 13. The positioning arm 22 is slid in the through groove 11 and abutted by the elastic blocking slice 12. The second fastening groove 23 is fastened on the windshield wiper fixing stage 4 and corresponding to the first fastening groove 13.

The combination structure between the assembling stage 10 and the positioning stage 20 is described in detail as follows. The assembling stage 10 has a first frame 101, a second frame 102, and a combining plate 103 which is formed on top surfaces of the first frame 101 and the second frame 102. The first frame 101 and the second frame 102 are arranged in a line. The first frame 101 forms the through groove 11. The second frame 102 forms a stop 104 at an outer side of the second frame 102 to abut against the driven wiper arm 3. In this embodiment, the stop 104 is wedge-shaped, but not limited.

The combining plate 103 forms the containing groove 100 at one side end of the combining plate 103. The elastic blocking slice 12 is formed on a bottom surface of the first frame 101. The elastic blocking slice 12 has a free end and the free end forms a hook 121. A set of opposite positioning plates 14 are arranged between the first frame 101 and the second frame 102 and each positioning plate 14 has the first fastening groove 13 thereon. That is, the two first fastening grooves 13 are arranged between the first frame 101 and the second frame 102. In this embodiment, the first fastening groove 13 is a U-shaped groove with a wider outside and narrower inside.

Furthermore, the cover cap 21 has a plurality of sliding-proof ribs 211. The positioning arm 22 is partially exposed outside the cover cap 21 and the second fastening groove 23 is arranged at an outer end of the positioning arm 22. The positioning arm 22 has a set of opposite through plates 221 and each through plate 221 has the second fastening groove 23 thereon. In addition, the positioning arm 22 forms a first retaining wall 222 and a second retaining wall 223 at two side edges of the second fastening groove 23, respectively.

Figure 5:
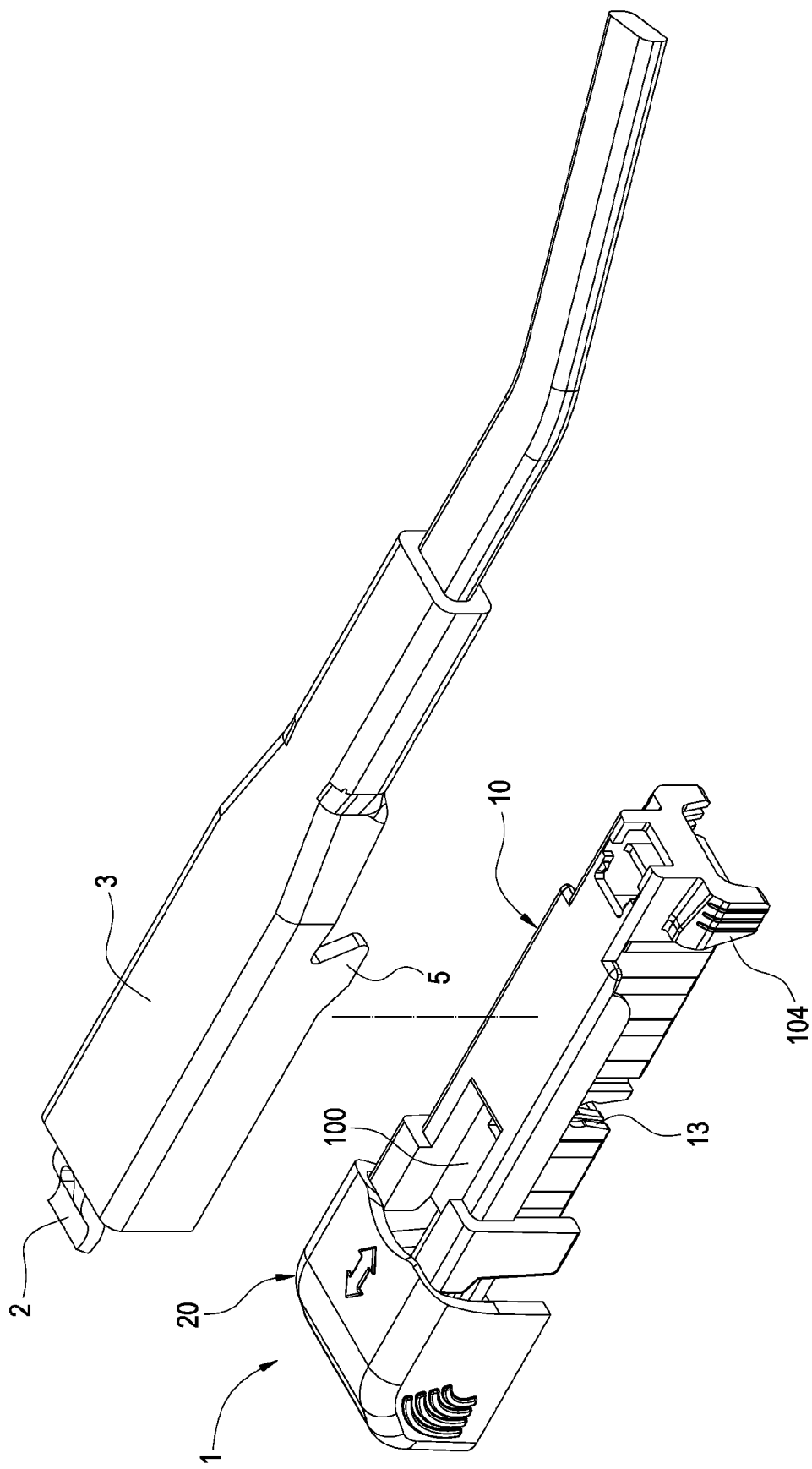
FIG. 5 is a schematic view of combining the windshield wiper assembling structure to a driven wiper arm according to the present invention.

Reference is made from FIG. 5 to FIG. 7 which are a schematic view of combining the windshield wiper assembling structure to a driven wiper arm and a first and a second assembled cross-sectional views of the driven wiper arm and an assembling stage according to the present invention, respectively. The hook arm 2 of the driven wiper arm 3 is placed in the containing groove 100 when the windshield wiper assembling structure 1 is combined to the driven wiper arm 3. In addition, the driven wiper arm 3 has a projecting wing 5. The projecting wing 5 abuts against one side edge of the stop 104 of the assembling stage 10 so that the driven wiper arm 3 is positioned on the assembling stage 10.

Afterward, the assembling stage 10 is pushed toward the positioning stage 20 so that the hook arm 2 is plunged into the cover cap 21. After the positioning arm 22 slides into the through groove 11 for a distance, the first retaining wall 222 presses the elastic blocking slice 12 to go across the hook 121. When the positioning arm 22 continuously slides to make the second fastening groove 23 correspond to the first fastening groove 13, the second retaining wall 223 fastens and positions the hook 121 of the elastic blocking slice 12, thus assembling the driven wiper arm 3 on the windshield wiper assembling structure 1. The driven wiper arm 3 is fastened and positioned by the assembling stage 10 and the positioning stage 20 so as to prevent loose attachment of the driven wiper arm 3 from the windshield wiper assembling structure 1.

Figure 8:
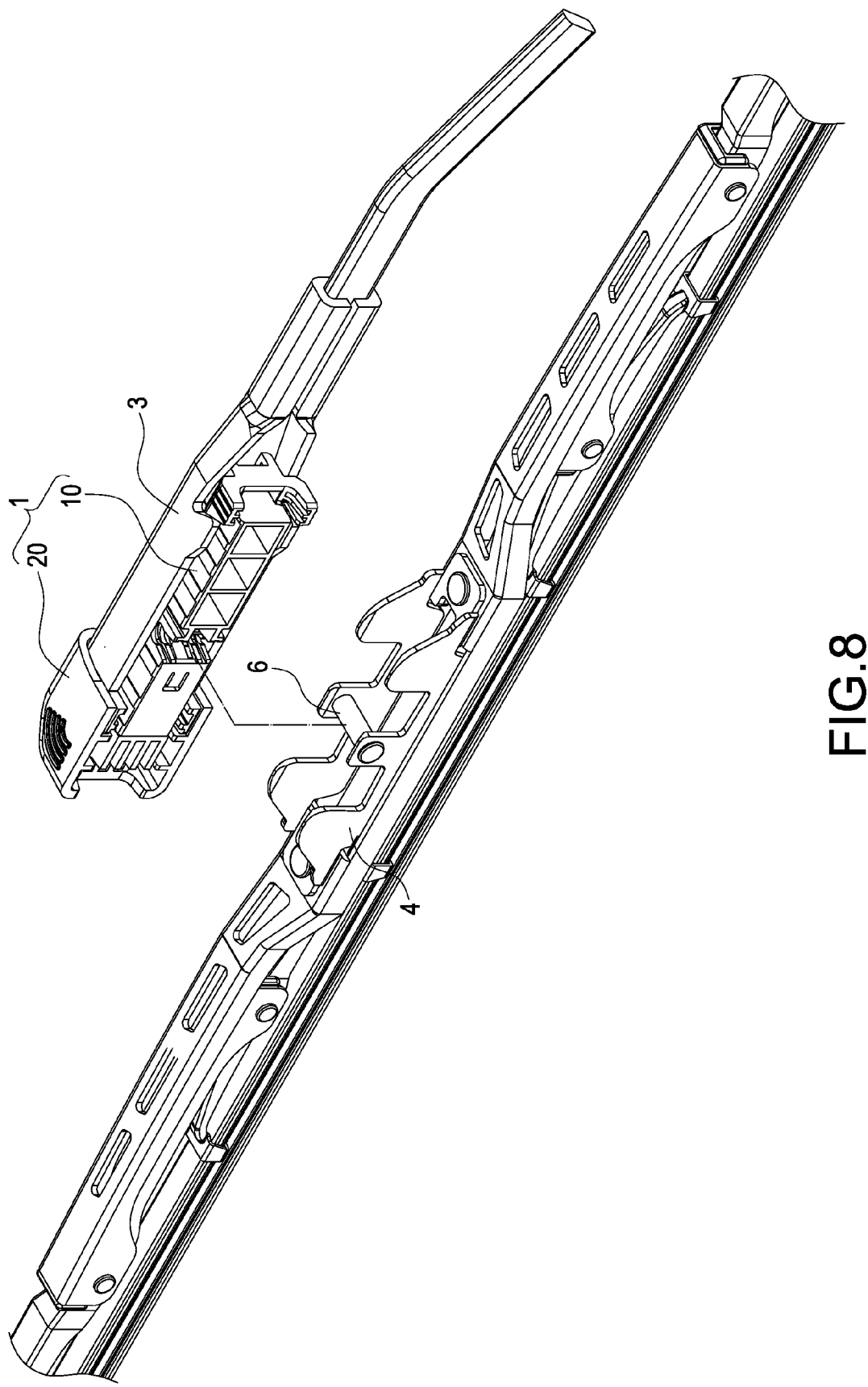
FIG. 8 is a schematic assembled view of the assembling stage and a windshield wiper fixing stage according to the present invention.
Figure 9:
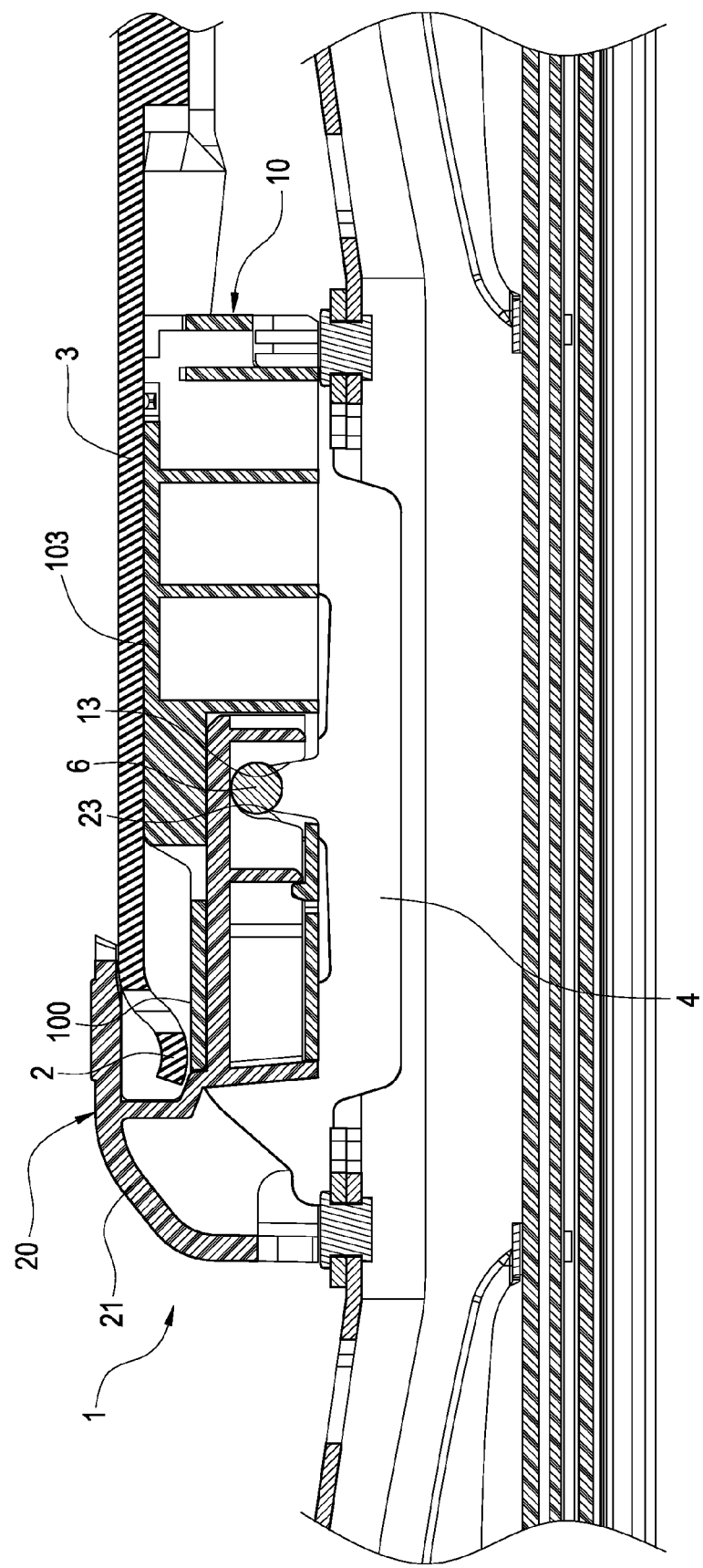
FIG. 9 is an assembled cross-sectional view of the assembling stage and the windshield wiper fixing stage according to the present invention.

Reference is made to FIG. 8 and FIG. 9 which are a schematic assembled view and an assembled cross-sectional view of the assembling stage and the windshield wiper fixing stage according to the present invention, respectively. As the above-mentioned description, the windshield wiper assembling structure 1 is provided to combine on the windshield wiper fixing stage 4. The windshield wiper fixing stage 4 has a pivot 6. The pivot 6 is used to embed the first fastening groove 13 of the assembling stage 10 and the second fastening groove 23 of the positioning stage 20. In practical applications, the driven wiper arm 3 can be firmly combined on the assembling stage 10 so that the windshield wiper can provide good wiping effect.

It is to be understood that both the foregoing general description and the following detailed description are exemplary, and are intended to provide further explanation of the invention as claimed. Other advantages and features of the invention will be apparent from the following description, drawings and claims.

What is claimed is:

1. A windshield wiper assembling structure for preventing loose attachment of a driven wiper arm, the assembling structure combining the driven wiper arm having a hook arm on a windshield wiper fixing stage; the windshield wiper assembling structure comprising:

an assembling stage having a through groove, an elastic blocking slice arranged in a route of the through groove, and a first fastening groove formed at one side edge of the elastic blocking slice, the first fastening groove fastened on the windshield wiper fixing stage, the assembling stage having a containing groove on a top surface of the assembling stage to accommodate the hook arm; and a positioning stage having a cover cap and a positioning arm extended from the cover cap, the hook arm plunged into the cover cap, the positioning arm having a second fastening groove corresponded to the first fastening groove, the positioning arm slid in the through groove and abutted by the elastic blocking slice, the second fastening groove fastened on the windshield wiper fixing stage and corresponding to the first fastening groove.

2. The windshield wiper assembling structure of claim 1, wherein the assembling stage has a first frame, a second frame, and a combining plate formed on top surfaces of the first frame and the second frame, the first frame and the second frame are arranged in a line.

3. The windshield wiper assembling structure of claim 2, wherein the first frame forms the through groove, the second frame forms a stop at an outer side of the second frame to abut against the driven wiper arm.

4. The windshield wiper assembling structure of claim 3, wherein the driven wiper arm has a projecting wing, the stop is wedge-shaped, the projecting wing abuts against one side edge of the stop.

5. The windshield wiper assembling structure of claim 2, wherein the elastic blocking slice is formed on a bottom surface of the first frame.

6. The windshield wiper assembling structure of claim 2, wherein the first fastening groove is arranged between the first frame and the second frame.

7. The windshield wiper assembling structure of claim 6, wherein the first frame and the second frame have a set of opposite positioning plates and each positioning plate has the first fastening groove on the positioning plate.

8. The windshield wiper assembling structure of claim 7, wherein the first fastening groove is a U-shaped groove with a wider outside and narrower inside.

9. The windshield wiper assembling structure of claim 1, wherein the elastic blocking slice has a free end and the free end forms a hook.

10. The windshield wiper assembling structure of claim 2, wherein the combining plate forms the containing groove at one side end of the combining plate.

11. The windshield wiper assembling structure of claim 1, wherein the cover cap has a plurality of sliding-proof ribs arranged on an outer surface of the cover cap.

12. The windshield wiper assembling structure of claim 1, wherein the positioning arm is partially exposed outside the cover cap and the second fastening groove is arranged at an outer end of the positioning arm.

13. The windshield wiper assembling structure of claim 12, wherein the positioning arm has a set of opposite through plates and each through plate has the second fastening groove on the through plate.

14. The windshield wiper assembling structure of claim 9, wherein the positioning arm forms a first retaining wall and a second retaining wall at two side edges of the second fastening groove, respectively, the second retaining wall fastens on the hook when the second fastening groove is corresponded to the first fastening groove.

* * * * *